United States Patent

[11] 3,619,182

| [72] | Inventors | Clarence G. Bieber<br>Suffern;<br>John J. Galka, Tuxedo, both of N.Y. |
|---|---|---|
| [21] | Appl. No. | 733,318 |
| [22] | Filed | May 31, 1968 |
| [45] | Patented | Nov. 9, 1971 |
| [73] | Assignee | The International Nickel Company, Inc.<br>New York, N.Y.<br>The portion of the term of the patent subsequent to Aug. 5, 1986, has been disclaimed. |

[54] CAST NICKEL-BASE ALLOY
9 Claims, No Drawings

[52] U.S. Cl.................................................. 75/171,
  148/32.5, 148/162
[51] Int. Cl......................................................... C22c 19/00
[50] Field of Search........................................... 75/171,
  170; 148/32, 32.5, 162

[56] References Cited
UNITED STATES PATENTS

| 3,085,005 | 4/1963 | Michael et al. | 75/171 |
| 3,164,465 | 1/1965 | Thielemann | 75/171 |
| 3,459,545 | 8/1969 | Bieber et al. | 75/171 |

*Primary Examiner*—Richard O. Dean
*Attorney*—Maurice L. Pinel

ABSTRACT: A cast alloy containing for example 0.2 percent carbon, 13 percent chromium, 10 percent cobalt, 2 percent molybdenum, 4 percent tungsten 4 percent tantalum 3 percent aluminum, 4.5 percent titanium, 0.02 percent boron, 0.1 percent zirconium, balance essentially nickel, has an unusual combination of properties at elevated temperatures including high stress-rupture strength, high resistance to the effects of oxidation and sulfidation, and structural stability.

CAST NICKEL-BASE ALLOY

The problem of providing alloys for elevated temperature service as in aircraft gas turbine blades and other parts has become more severe as larger and more powerful engine become necessary to power larger and faster aircraft and the projected engine service life is extended. Many factors are involved. Thus, greater efficiency can be realized in the engine when higher temperatures can be employed in the turbine, but operating temperatures in the turbine are limited by the strength of the turbine blade alloys at the operating temperatures. Another operating factor which has become a limiting factor as the reliability of the aircraft gas turbine engine has been improved is that of corrosion of the turbine blades. Corrosion is an extremely complex problem flowing from the nature of the hot gases created by combustion of fuel in the engine which impinge at high velocity against the blade surfaces. Thus, a source of corrosion is sulfur in the fuel and the sulfidation problem is accentuated by ingestion of chlorides when the aircraft is operated in marine atmospheres such as those encountered at airports located near the sea. Oxidation of the blades caused by contact with the hot gases is also a problem. Corrosion of the blades can be mitigated by various coating procedures or by the use of sulfur-neutralizing additives to the fuel. However, coatings are subject to erosion from the hot gases which impinge upon the turbine blade surfaces at high velocities and from various solid particles which can be entrained in the hot gas from various sources. Since it is an objective to operate the engine for long periods, e.g., up to 12,000 hours between major engine overhauls, it is the usual experience to find that the blade coating has partly or even wholly disappeared when the engine is overhauled. Coatings can be damaged by accidental mechanical effects at an early stage in service. Research pertaining to treatments of the fuel to mitigate or correct the sulfidation effect on turbine blades has not as yet been productive.

From the foregoing review, it is to be seen that the problem of providing an alloy suitable for use as an aircraft gas turbine blade has become more complex and more difficult of solution as newer, larger and more powerful engines are evolved in response to demands upon the turbine engine industry by airframe manufacturers. The blade material must be resistant to oxidation, sulfidation, erosion, etc., and must have the highest possible strength at the temperatures prevailing in the hot combustion gases. Most modern gas turbine engine blades are fabricated by casting to shape and casting techniques for this purpose are now well developed.

The problem confronting the metallurgist in providing new alloys for gas turbine blade service is multifold. The alloy must be castable and must have high strength at operating temperatures circa 1800° F. In view of the increased emphasis on the part of engine builders for a solution to the elevated temperature corrosion problem, alloys must be provided which have improved resistance to sulfidation and oxidation. In addition to all the foregoing criteria, the alloy must have satisfactory ductility at the operating temperature and at other lower temperatures and desirably should not form brittle phases, such as sigma phase, or other undesirable phases, on long term exposure to the combined effects of temperature and stress, i.e., the alloy should have good structural stability.

Nickel-chromium base alloys are available which have good strength at temperatures circa 1800° F. In almost every case, the strongest of such alloys contains about 12 percent or 10 percent or less chromium, by weight, along with various other combinations of strengthening elements. Research had indicated that these available strong alloys were not resistant to sulfidation and other elevated temperature corrosion phenomena but were instead subject to severe attack due to corrosion in service. It is known that chromium contributes greatly to the improvement of sulfidation and oxidation resistance in nickel-chromium alloys. Thus, nickel-chromium alloys containing chromium circa 16 percent to 20 percent have improved corrosion resistance at elevated temperature. However, an attempt merely to increase chromium in known alloys to improve the corrosion resistance thereof, has catastrophic effects upon the other required properties. Thus, such attempts have resulted in alloys which had markedly lower strength, had reduced ductility and/or had poor long time structural stability. The progress of such research accordingly indicated that elevated temperature corrosion resistance in a cast nickel-chromium base gas turbine blade alloy could only be improved at the sacrifice of another property which was also required.

We have now discovered a nickel-base alloy containing a special combination of alloying ingredients including a special amount of chromium which has high strength and ductility at 1800° F. and at lower temperatures together with high sulfidation and oxidation resistance at elevated temperatures, and microstructural stability.

It is the object of the present invention to provide an alloy having good castability, high strength and ductility at elevated temperatures together with high elevated temperature sulfidation and oxidation resistance.

Other objects and advantages of the invention will become apparent from the following description.

Broadly stated, the present invention is directed to an alloy having, in properly heat treated cast form, a combination of properties including castability, high elevated temperature strength and ductility and high elevated temperature corrosion resistance, including resistance to sulfidation and oxidation, containing, by weight, about 9.5 percent or 10 percent to about 14 percent, e.g., about 10.5 percent to about 13.5 percent, chromium, about 7 percent to about 11 percent, e.g., about 10 percent, cobalt, about 1 percent to about 2.5 percent, e.g., about 2 percent, molybdenum, about 3 percent to about 6 percent, e.g., about 4 percent, tungsten, about 1 percent to about 4 percent, e.g., about 2 percent to about 4 percent, tantalum, about 3 percent to about 4 percent aluminum, about 3 percent to about 5 percent titanium, with the aluminum plus titanium content being about 6.5 percent or 7 percent to about 8 percent, up to about 1 percent columbium, about 0.005 percent to about 0.05 percent, e.g., about 0.02 percent, boron, about 0.01 percent to about 0.25 percent, e.g., about 0.1 percent, zirconium, about 0.02 percent to about 0.25 percent carbon, and the balances essentially nickel.

The alloy usually contains about 11 percent to about 13.5 percent chromium, since corrosion resistance becomes detrimentally affected at lower chromium contents than about 10.5 percent while at chromium contents above about 13.5 percent or 14 percent elevated temperature strength is reduced and the possibility of encountering undesirable structural changes upon long-time exposure to elevated temperature is increased. The total content of aluminum plus titanium should be correlated to the chromium content of the alloy in the interests of securing the best combinations of strength, ductility, structural stability and elevated temperature corrosion resistance such that, at a chromium content of about 11 percent, the sum of aluminum and titanium is about 8 percent, while at a chromium content of about 13 percent, the sum of aluminum and titanium is about 7 percent. Cobalt, molybdenum, tungsten and tantalum are essential elements at levels of about 10 percent, about 2 percent, about 4 percent and about 4 percent, respectively, to provide, along with the controlled contents of chromium, aluminum and titanium the special combination of strength and elevated temperature corrosion resistance which characterizes the alloys. Columbium may also be employed in amounts of up to about 1 percent in combination with the other strong carbide-forming elements to contribute to strength and corrosion resistance of the alloy. Carbon is employed in amounts of about 0.02 percent to about 0.2 percent. Advantageously, carbon is employed in amounts of about 0.02 percent to about 0.06 percent or about 0.14 percent to about 0.2 percent because best strength properties are obtained when either of these carbon ranges is used, with indications being that intermediate carbon alloys have power strength. Boron and zirconium are employed in the alloy in order to provide improved ductility in the alloy at high temperature. The balance of the alloy is essentially nickel, with small amounts of incidental elements and impurities. Iron is an undesirable impurity in the alloy and should not be present in amounts exceeding 2 percent or 3 percent. Impurities such as lead, sulfur, phosphorus, antimony, tin, selenium, tellurium, bismuth, arsenic, nitrogen, etc., should be as low as possible. Silicon, copper and manganese are undesirable and should not be present in amounts exceeding 0.5 percent each.

The alloy preferably is prepared by vacuum melting and/or vacuum treating and is cast in vacuum. Desirably the master heat technique is employed to provide vacuum melted material which preferably is vacuum remelted and vacuum cast into usable parts. Castings produced are of excellent quality as regards soundness and surface finish. The good castability of the alloy is evident in that castings of thin section as in turbine blade castings can readily be produced with good filling of the mold. Inoculated molds can be employed to produce fine grained castings.

The castings can be employed as such with good results. Elevated temperature properties of the castings are enhanced by employing a heat treatment comprising heating at about 2050° F. to about 2150° F. for 1 to 2 hours followed by aging at about 1500° F. to about 1600° F. for about 2 hours to 48 hours, e.g., about 24 hours. An intermediate heating at about 1875° F. to about 1975° F. for about 2 hours to about 8 hours, e.g., 4 hours, may be employed with beneficial effects upon rupture strength of the alloy in the temperature range of about 1300° F. to about 1500° F.

Properly heat treated castings will provide a life to rupture at 1800° F. and 29,000 pounds per square inch (p.s.i.) of at least about 23 hours, with an elongation at rupture of at least about 4 percent.

In order to give those skilled in the art, a better understanding and/or appreciation of the advantages of the invention, a series of melts was prepared by vacuum melting high purity virgin raw materials and vacuum cast to provide master alloys. The master alloys were vacuum remelted and vacuum cast into preheated, inoculated, refractory molds to provide test castings including cast-to-size test bars. The compositions prepared within the invention are set forth in the following table I.

TABLE I

| Alloy No. | 1 | 2 | 3 | 4 | 5 | 6 |
|---|---|---|---|---|---|---|
| Percent: | | | | | | |
| C | 0.04 | 0.18 | 0.18 | 0.04 | 0.04 | 0.04 |
| Cr | 13 | 13 | 11 | 12 | 13 | 13 |
| Co | 10 | 10 | 10 | 10 | 10 | 10 |
| Mo | 2 | 2 | 2 | 2 | 2 | 2 |
| W | 4 | 4 | 4 | 6 | 4 | 4 |
| Cb | 1 | | 0.5 | 1 | | 0.5 |
| Ta | 2 | 4 | 4 | 2 | 4 | 4 |
| Al | 4 | 3 | 3 | 4 | 4 | 4 |
| Ti | 3 | 4.5 | 5 | 3 | 3 | 3 |
| Ni | (1) | (1) | (1) | (1) | (1) | (1) |

¹Balance

NOTE.—The above alloys were produced using additions of about 0.02% boron and about 0.1% zirconium and were essentially devoid of iron, silicon, manganese, copper and other impurities.

Cast-to-size test bars from the foregoing melts were heat treated for 2 hours at 2050° F., and for about 24 hours at 1550° F. (Heat Treatment A). Duplicate heat treated bars were subjected to stress-rupture testing at 1800° F. and 29,000 p.s.i. with the results set forth in table II in which the average of the two test values is given.

TABLE II

| Alloy No. | Life, hours | Elongation, % |
|---|---|---|
| 1 | 30 | 12 |
| 2 | 48 | 10 |
| 3 | 56 | 6.5 |
| 4 | 44.5 | 9 |
| 5 | 39 | 6 |

The foregoing results demonstrate that alloys provided in accordance with the invention provide a stress-rupture strength equaling or exceeding that of other cast nickel-chromium base alloys which have been employed successfully as cast gas turbine blade materials in standard aircraft jet engines. Thus, a standard material known as Alloy 713C (AMS 5391) which contains about 0.12 percent carbon, 12.5 percent chromium, 4.2 percent molybdenum, 2 percent columbium, 0.8 percent titanium, 6.1 percent aluminum, 0.012 percent boron, 0.1 percent zirconium, balance nickel, has a rupture life at 1800° F. and 29,000 p.s.i. of about 9 hours. Another commercial alloy, IN 100, which has been widely used as a gas turbine blade material contains about 0.18 percent carbon, 10 percent chromium, 15 percent cobalt, 3 percent molybdenum, 4.7 percent titanium, 5.5 percent aluminum, 1 percent vanadium, 0.014 percent boron, 0.06 percent zirconium, balance nickel, is produced to a specification requiring a minimum life to rupture at 1800° F. and 29,000 p.s.i. of 23 hours.

Another feature of alloys provided in accordance with the invention is high elongation in short-time tensile testing at 1600° F. in the Heat Treatment A condition. Thus, Alloy No. 1 displayed an elongation of 12 percent and a reduction in area of 17 percent, Alloy No. 2 an elongation of 18 percent and a reduction in area of 24 percent, while Alloy No. 3 displayed an elongation of 6 percent and a reduction in area of 10 percent, all at 1600° F. The high ductility factors displayed by Alloy No. 2 is taken by some engine designers as an indication of good thermal fatigue resistance in a cast gas turbine blade alloy.

Coupled with the aforediscussed highly satisfactory strength, the alloys provided in accordance with the invention display outstanding elevated temperature corrosion resistance. Corrosion resistance of the alloys was demonstrated by subjecting short bars about 10 mm. square to the action of a molten salt mixture containing about 80 percent sodium sulfate and about 20 percent sodium chloride at 1700° F. in air. The severity of this test is demonstrated by the fact that similar bars of the 713C and IN 100 alloys were destroyed in the molten salt by a 4-hour exposure thereto. In contrast, alloys in accordance with the invention withstood the severe corrosive effects of the molten salt for about 300 hours with only slight attack. Lower strength, prior art alloys containing about 19 percent chromium, such as the alloys sold under the trademark Waspaloy and Udimet 500 are corroded more severely than alloys within the invention in the molten salt test. Paddles made of Alloys Nos. 1, 2 and 3 also displayed good sulfidation and oxidation resistance in a rig test simulating aircraft gas turbine engine conditions, while similar paddles of Alloy 713C and IN 100 were judged poor in the same test.

Oxidation resistance of Alloys Nos. 1, 2 and 3 was also judged good in a 1,000-hour cyclic oxidation test in which the test specimens were exposed to air at a maximum temperature of 1800° F. In conducting this test, short bars about one centimeter square having a surface area of about 12 square centimeters were prepared from the test alloys. The bars were heated to 1800° F. in air and cycled once every 24 hours to room temperature. At the end of a 1,000-hour run, the bars were cleaned and weighed with the results in terms of weight loss for alloys of the invention which are set forth in the following table III.

TABLE III

| Alloy No. | Weight loss——grams |
|---|---|
| 1 | 0.2263 |
| 2 | 0.1400 |
| 3 | 0.1483 |
| 6 | 0.2926 |

Similar bars made of the IN 100 alloy were completely destroyed by oxidation after only a few days in this test, although Alloy 713C is resistant to the test.

Room temperature tensile testing of alloys in accordance with the invention using specimens prepared as described in connection with table II in the Heat Treatment A condition provided the results set forth in table IV.

TABLE IV

| Alloy No. | Yield strength (0.2% offset), p.s.i. | Tensile strength, p.s.i. | Elongation percent | Reduction in area, percent |
|---|---|---|---|---|
| 1 | 122,100 | 159,800 | 8.0 | 8.0 |
| 3 | 134,200 | 159,800 | 5.0 | 8.0 |
| 4 | 138,800 | 169,300 | 10.0 | 14.0 |
| 5 | 134,600 | 156,900 | 6.0 | 9.0 |

Further rupture testing of alloys in accordance with the invention using specimens prepared as described in connection with table II provided the results set forth in table V.

TABLE V

| Alloy No.: | Heat treatment | Test temperature °F. | Stress, p.s.i. | Life to rupture, hours | Elongation, percent | Reduction in area, percent |
|---|---|---|---|---|---|---|
| 1 | B | 1,800 | 22,000 | 145.1 | 8.9 | 16 |
|   |   | 1,700 | 39,000 | 64.1 | 10.7 | 12.3 |
|   |   | 1,400 | 90,000 | 304.5 | 8.0 | 10.1 |
| 2 | B | 1,800 | 13,000 | 1855.6 | 8.0 | 7.90 |
|   |   | 1,500 | 40,000 | ¹2920+ |  |  |
|   |   | 1,700 | 39,000 | 83.9 | 7.1 | 12.3 |
| 4 | A | 1,500 | 40,000 | 2189.8 | 8.0 | 11.6 |
|   |   | 1,400 | 90,000 | 351.1 | 8.9 | 11.3 |
| 5 | A | 1,700 | 40,000 | 58.0 | 11.5 | 14.3 |
|   |   | 1,500 | 50,000 | 1502.1 | 2.7 | 5.5 |
|   |   | 1,400 | 90,000 | 160.2 | 5.3 | 7.8 |
| 6 | B | 1,700 | 39,000 | 76.0 | 8.9 | 7.8 |
|   |   | 1,400 | 90,000 | 266.2 | 8.9 | 11.6 |
| 6 | A | 1,400 | 90,000 | 193.9 | 6.2 | 7.1 |

¹ Specimen unbroken.

NOTE.—Heat Treatment "B" consisted of heating at 2,150° F. for 2 hours, then heating at 1,925° F. for 4 hours, then heating at 1,550° F. for 24 hours.

Examination of alloy structures after the creep test exposures set forth in table V revealed no sigma phase formation as a result of exposure to stress and temperature for an extended time.

The density of Alloys Nos. 1, 2 and 3 was 0.298, 0.299 and 0.300 pounds per cubic inch, respectively, and was thus only insignificantly higher than that of Alloy 713C (0.286) and IN 100 (0.280). Density of a gas turbine blade alloy is an important design feature since the turbine revolves at such high speed and the blades are at the periphery.

Cast alloys provided in accordance with the invention are useful not only for gas turbine blades, but also as nozzle vanes, dies and other tools, etc.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

We claim:

1. An alloy having a high elevated temperature strength together with high resistance to elevated temperature sulfidation and oxidation consisting essentially of about 9.5 percent to about 14 percent chromium, about 7 percent to about 11 percent cobalt, about 1 percent to about 2.5 percent molybdenum, about 3 percent to about 4 percent tungsten, about 1 percent to about 4 percent tantalum, up to about 1 percent columbium, about 3 percent to about 4 percent aluminum, about 3 percent to about 5 percent titanium, with the aluminum plus titanium content being about 6.5 percent to about 8 percent, about 0.005 percent to about 0.05 percent boron, about 0.01 percent to about 0.25 percent zirconium, about 0.02 percent to about 0.25 percent carbon and the balance essentially nickel.

2. An alloy in accordance with claim 1 wherein the chromium is about 10.5 percent to about 13.5 percent, the cobalt content is about 10 percent, the molybdenum content is about 2 percent, the tungsten content is about 4 percent and the tantalum content is about 4 percent.

3. An alloy in accordance with claim 1 containing about 0.04 percent carbon, about 13 percent chromium, about 10 percent cobalt, about 2 percent molybdenum, about 4 percent tungsten, about 1 percent columbium, about 2 percent tantalum, about 4 percent aluminum, about 3 percent titanium, about 0.02 percent boron, about 0.1 percent zirconium and the balance essentially nickel.

4. An alloy in accordance with claim 1 containing about 0.18 percent carbon, about 13 percent chromium, about 10 percent cobalt, about 2 percent molybdenum, about 4 percent tungsten, about 4 percent tantalum, about 3 percent aluminum, about 4.5 percent titanium, about 0.02 percent boron, about 0.1 percent zirconium, and the balance essentially nickel.

5. An alloy in accordance with claim 1 containing about 0.18 percent carbon, about 11 percent chromium, about 10 percent cobalt, about 2 percent molybdenum, about 4 percent tungsten, about 0.5 percent columbium, about 4 percent tantalum, about 3 percent aluminum, about 5 percent titanium, about 0.02 percent boron, about 0.1 percent zirconium, and the balance essentially nickel.

6. An alloy in accordance with claim 1 containing about 10.5 percent to about 13.5 percent chromium.

7. An alloy in accordance with claim 1 containing chromium proportioned to the total content of aluminum and titanium such that at a chromium content of about 11 percent, the aluminum plus titanium content is about 8 percent while at a chromium content of about 13 percent, the aluminum plus titanium content is about 7 percent.

8. An alloy in accordance with claim 1 containing about 0.02 percent to about 0.06 percent carbon.

9. An alloy in accordance with claim 1 containing about 0.14 percent to about 0.2 percent carbon.

* * * * *